June 27, 1967 A. J. ZIMMERMAN 3,328,773

DATA PROCESSOR SET AND INDICATE CONTROL SYSTEMS

Filed Feb. 1, 1965 4 Sheets-Sheet 1

INVENTOR
Arlen J. Zimmerman

BY Hall, Pollock & VandeSande
ATTORNEYS

June 27, 1967 A. J. ZIMMERMAN 3,328,773

DATA PROCESSOR SET AND INDICATE CONTROL SYSTEMS

Filed Feb. 1, 1965 4 Sheets-Sheet 2

INVENTOR
Arlen J. Zimmerman

BY Hall, Pollock & Vande Sande

ATTORNEYS

DATA PROCESSOR SET AND INDICATE CONTROL SYSTEMS

Filed Feb. 1, 1965

INVENTOR

Arlen J. Zimmerman

BY Hall, Pollock & Vande Sande

ATTORNEYS

INVENTOR
Arlen J. Zimmerman
BY Hall, Pollock & Vande Sande
ATTORNEYS

United States Patent Office 3,328,773

Patented June 27, 1967

3,328,773

DATA PROCESSOR SET AND INDICATE CONTROL SYSTEMS

Arlen J. Zimmerman, Minneapolis, Minn., assignor to Sperry Rand Corporation, New York, N.Y., a corporation of Delaware Filed Feb. 1, 1965, Ser. No. 429,266
17 Claims. (Cl. 340—172.5)

The present invention relates to data processing systems of the types employing one or more central data processors associated with one or more control consoles located at positions remote from said data processors; and is more particularly concerned with circuit arrangements in systems of the types described adapted to reduce the number of control leads normally required between the data processors and operator's consoles.

In systems employing a console for selective control of a remote computer or data processing apparatus, it is necessary to provide circuit connections, normally taking the form of buses, between the console and data processor in order to permit signals to be transferred from the console to the data processor, or vice versa. It is customary for a data processor to include a number of bistable devices or flip flops, for example. It is further customary for a control console to include signal generating devices, as well as signal monitoring devices individually operative to selectively set computer flip flops to desired operation conditions, and/or to monitor the operating conditions of such flip flops; and the aforementioned bus means interconnect said processor and console structures to provide for the signal transfers necessary to effect these functions. The aforementioned computer flip flop structures may comprise one or more flip flops which must be individually set to particular operating conditions for control purposes. The said computer flip flop or bistable structures may also be arrayed in registers, the individual stages of which may have to be set to establish a signal pattern representative of a multi-bit item of information in one or more of said registers. In the past, it has been customary for the buses, extending between the control console and computer, to include individual leads functioning solely and respectively to transfer individual setting signals from the console to the various different processor flip flops or register stages. When the control console also includes indicator devices or other equipment adapted to monitor the information present in one or more registers, or the operating state of any particular control flip flop, it has also been customary in the past for said buses to include further separate leads extending between the console and remote data processor functioning solely and respectively to transfer monitoring signals to the console.

In systems of the general type described, it is customary for the computer or data processor to have a relatively large number of stages subject to console control and monitoring. The need for separate leads to transfer setting signals from a console to a computer, and to transfer monitoring signals from the computer to the console, has accordingly required highly complex coupling arrangements employing very large numbers of control leads. The complexities thus inherent in the case of even a single data processor associated with only a single control console become aggravated when it is desired to use a single control console to operate a plurality of processors, or to utilize any one of a plurality of control consoles to operate a single data processor, since the number of leads extending between the several consoles and data processor, or between the several data processors and common control console, is necessarily multiplied by a factor related to the additional number of consoles or additional number of data processors employed. The situation becomes even more aggravated when it is desired to associate a plurality of consoles with a plurality of data processors in an overall system wherein any selected one of said plural consoles is adapted to control and monitor any selected one of said plural data processors. Indeed, in this latter case, the bus arrangements extending between the consoles and data processors may become so unwieldy as to severely limit the type of control and monitoring which may be effected; and in any event, the complexity of the necessary coupling systems imposes significant engineering and maintenance problems.

Recognizing these disadvantages of systems suggested heretofore, wherein separate control leads are individually utilized for the various purposes described, the present invention is particularly concerned with coupling systems arranged to appreciably reduce the number of control leads needed between a computer and console. More particularly, the coupling systems of the present invention employ signal control leads each of which is adapted to perform the dual function of transferring a setting signal from a console to a processor flip flop or register stage, and for transferring a signal from the processor to the console for monitoring the operating condition of a processor flip flop or register stage. The present invention, moreover, achieves even further economies in the number of leads which would otherwise be required in a multi-processor system utilizing one or more control consoles, through the provision of a novel enable system permitting the prior selection of a particular one of said plural data processors and/or consoles to be controlled. Thus, through the provision of said enable system, common leads may be employed not only for the dual function described previously, but may also be provided for control of any one of several data processors and/or any one of several control consoles without the need for duplicate control leads extending between the several data processors and control consoles.

It is accordingly an object of the present invention to provide an improved data processor/control console system wherein flip flop setting and signal monitoring functions are accomplished over common control leads.

Another object of the present invention resides in the provision of an improved enable system reducing the number of leads which would otherwise be required for multi-processor operation under the control of one or more control consoles.

A further object of the present invention resides in the provision of data processor and control console systems having a simplified bus system therebetween involving the use of fewer leads than has been considered necessary heretofore.

A still further object of the present invention resides in the provision of data processing systems which are more easily maintained and less subject to operating difficulties than has been the case heretofore.

Another object of the present invention resides in the provision of multiprocessor systems capable of a wider facility of remote control than has been the case heretofore.

In providing for the foregoing objects and advantages, and for other objects and advantages which will appear hereinafter, the present invention contemplates the provision of an improved data processor set and indicate control system utilizing novel driver isolation or control circuits disposed between processor located bistable and console located set and indicate circuits wherein control of a flip flop, and monitoring of its state, is effected through a single control set and indicate lead. As will appear hereinafter, the said driver isolation or control circuits are so arranged that they may manifest different operating states, in one of which operating states, a data processor located flip flop may effect a signal transfer to a console located monitoring device, and in the other of which operating states a console generated setting signal may be transferred to a data processor located flip flop or register.

In a preferred embodiment of the invention, the said driver isolation or control circuits include enable leads arranged to be controlled at the console for determining of said operating states is to be effected. Moreover, as will appear hereinafter, the driver isolation or control circuits may be located at the data processor. By such an arrangement, when a plurality of data processors are employed, a plurality of corresponding flip flops or register stages in the several data processors may be bused together at the data processor locations, whereby a single control lead associated with a pair of enable leads extending between the interconnected data processors and a common remote console is all that need be employed to permit proper setting and monitoring operations for any given flip flop in any one of a plurality of processors.

The enable systems characterizing the present invention, moreover, can be associated with control arrangements to be described, to permit a plurality of data processors to be operatively associated with a plurality of control consoles, whereby only one of a plurality of control consoles may be selected for processor control without requiring the complex console/processor busing arrangement which have been considered necessary heretofore. These control arrangements are, moreover, preferably such that when any one of the plural consoles is selected for processor operation, it assumes complete and sole control thereby preventing possible errors due to inadvertent attempts to effect different control functions at more than one console; and in these preferred arrangements, the several control consoles may, notwithstanding the assumption of control by a single console, all view or monitor the processor operations simultaneously.

The foregoing objects, advantages, construction and operation of the present invention will become more readily apparent from the following description and accompanying drawings, in which.

Figure 1:
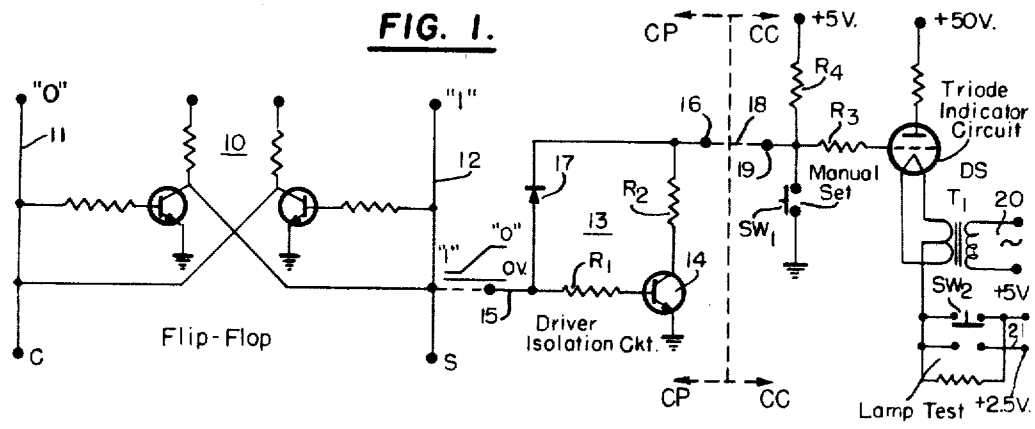
FIGURE 1 illustrates a typical logic circuit such as may be employed to reduce the number of control leads but permitting both setting and monitoring signals to be transferred via a common control lead.

Referring initially to FIGURE 1, it will be seen that one portion of an overall data processor set and indicate control system, constructed in accordance with one form of the present invention, may comprise a flip flop circuit 10 located at a data processor and comprising a control flip flop or one stage of an interface register adapted to store a bit therein. It will be appreciated, of course, that a given data processor register may comprise a large plurality of flip flops similar to flip flop 10, and it will further be appreciated that a given data processor may employ a number of multiple flip flop registers, each flip flop of which could be associated with a circuit of the type illustrated in FIGURE 1 (or FIGURE 4 to be described hereinafter). For simplification, however, only one such flip flop has been illustrated in FIGURE 1.

The flip flop 10 is represented in simplified form and is, in itself, entirely conventional, comprising a pair of transistor elements interconnected in known manner to exhibit bistable operation producing outputs at a pair of lines 11 and 12. The said flip flop is adapted to be cleared by application of a signal to a terminal C, and is adapted to be set by application of a signal to a terminal S.

The terminal S of flip flop 10 is coupled to a driver isolation or control circuit 13 consisting of a transistor 14 having its emitter grounded, having its base coupled via a resistor $R_1$ to a line 15 which is in turn connected to the aforementioned flip flop terminal S, and having its collector coupled via a resistor $R_2$ to a control terminal 16. A rectifier 17, poled as shown, interconnects line 15 and terminal 16. The driver isolation circuit 13 may be located at the central data processor along with its associated flip flop 10; and this is designated by the broken line configuration in FIGURE 1 having the legends CP (central processor) at opposing ends thereof.

Terminal 16 may be coupled via a lead, designated in broken line at 18, to a console (identified by the legends CC) having a triode indicator circuit DS which may consist of, for example, a type 6977 triode indicator circuit, in itself well known. Other known indicator circuits could be employed, e.g., those utilizing a type 8569 triode. The grid of the triode indicator circuit is coupled by a resistor $R_3$ to the aforementioned lead 18. The input terminal 19 of the triode grid circuit is coupled via a resistor $R_4$ to a +5 volt potential source, and is also coupled via a selectively actuated manual set switch $SW_1$ to ground. The anode of the triode indicator tube DS is coupled to an appropriate source of positive potential, and the filament of said circuit may be coupled via a transformer $T_1$ to an energizing source 20. The secondary of transformer $T_1$ includes a lamp test switch $SW_2$ which normally couples the triode filament to a +5 volt reference source as illustrated, but which may be caused, upon actuation of switch $SW_2$, to couple a +2.5 volt reference source 21 to said filament circuit.

In considering the circuit operation of the overall system shown in FIGURE 1, a negative logic convention is followed wherein a binary "1" is represented by the more negative of two signal levels, with a binary "0" being represented by the more positive of said two signal levels, both signals being positive with respect to ground. This particular convention is illustrated schematically adjacent line 15 of FIGURE 1. If we now assume that the flip flop 10 is in a stable state wherein a binary "1" is present on its line 12, the more negative of the two signals is applied via line 15 and resistor $R_1$ to the base of transistor 14 operating to bias said transistor 14 to cut off. The triode indicator DS has its grid circuit coupled via terminal 19, lead 18, terminal 16, and resistor $R_2$ to the collector of transistor 14. Since, for the assumed condition, transistor 14 is cut off, the grid of the triode indicator circuit DS will (due to the +5 volt reference applied thereto via $R_4$) be at some positive level with respect to ground or at a zero potential with respect to the filament reference voltage of +5 volts applied via switch $SW_2$. Under these circumstances, therefore, the triode indicator DS will conduct and produce a visual display, i.e., the binary "1" at the processor flip flop terminal S manifests itself by conduction of the console located triode indicator circuit.

If we now consider the situation in which the processor flip flop 10 has a potential on its line 12 representative of a binary "0" condition, the signal applied via line 15 and resistor $R_1$ to the base of transistor 14 will be at its more positive level, thereby causing transistor 14 to conduct via resistors $R_2$ and $R_4$. This in turn causes the potential at terminal 16 to fall below the +5 volt reference applied to resistor $R_4$ to a lower value determined by the values of $R_2$, $R_4$ and the characteristics of transistor 14, e.g., to fall to a potential of substantially +2.5 volts with respect to ground. This in turn causes the grid of the triode indicator circuit DS to be at substantially −2.5 volts with respect to the normal indicator filament reference voltage of +5 volts. Accordingly, the triode indicator will be turned off, i.e., a binary "0" at the processor flip flop terminal S causes the console located triode indicator circuit to give no visual display.

It will accordingly be appreciated that the system thus far described in reference to FIGURE 1 causes the triode indicator circuit DS to monitor the state of flip flop 10, and to give a characteristic indication as to that state.

Considering the circuit of FIGURE 1 further, and regardless of the condition of the flip flop 10, of the driver isolation circuit 13, or of the triode indicator DS, if the manual set switch $SW_1$ should now be depressed, terminal 19 will be placed at ground potential. This condition is transferred via lead 18 to the driver isolation circuit 13 and causes line 15 thereof to fall in potential, via rectifier 17, to a binary "1" condition, thus setting the flip flop 10 to that condition if it is not already so set. With a "1" at terminal S and on line 15, if the manual set switch $SW_1$ should now be released, transistor 14 will again cut off permitting the voltage at terminal 16 to approach the +5 volt supply coupled thereto via resistor $R_4$, whereupon the triode indicator will conduct and display a binary "1" condition for the flip flip 10. Thus, the circuit of FIGURE 1 not only permits the triode indicator circuit to monitor the existing state of flip flop 10, but also permits flip flop 10 to be set when desired; and these dual functions are accomplished via the single control lead 18 interconnecting the central processor and the control console.

A lamp test circuit has also been incorporated into the arrangement of FIGURE 1. Regardless of the condition of the flip flop 10 or driver isolation circuit 13 when switch $SW_2$ is depressed, the triode filament reference drops from +5 to +2.5 volts. Since the triode grid potential is always at, or more positive than, +2.5 volts, the indicator DS will be forced into a conducting condition for test purposes.

Figure 2:
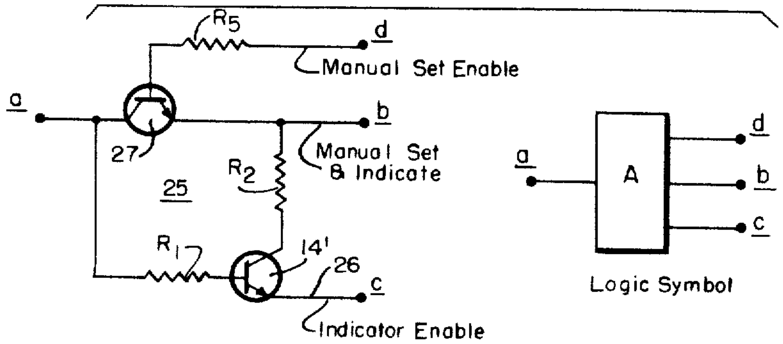
FIGURE 2 illustrates an improved driver isolation or control circuit, and its logic symbol, such as may be employed in the present invention, and incorporating the enable functions which characterize a preferred embodiment of the present invention.

The circuit thus provided in FIGURE 1 is primarily adapted for use in a single processor-single console type arrangement. Where more than one processor is to be controlled by a single console however, an enable circuit should be added; and this can be effected by replacing the driver isolation circuit 13 by an alternative form of driver isolation circuit 25 such as is shown in FIGURE 2. In the alternative form of circuit, the normally grounded emitter of transistor 14 (of FIGURE 1) is replaced by a control arrangement adapted to ground said emitter at the console via a switch; and the rectifier 17 (of FIGURE 1) is replaced by another transistor, the base of which may be coupled at the console via a switch to a positive potential (e.g., +2 volts) to effect an enabled condition, and coupled to ground to effect a disabled condition. More particularly, the arrangement of FIGURE 2 comprises a transistor 14' having its emitter coupled to an "indicator enable" line 26 terminating at a terminal *c* which may be selectively grounded. The base of transistor 14' is again coupled via resistor $R_1$ to a terminal *a* which corresponds to line 15 of FIGURE 1, and the collector of transistor 14' is coupled via resistor $R_2$ to a terminal *b* which corresponds to terminal 16 of FIGURE 1, i.e., to the common manual set and indicator control line 18 of FIGURE 1. A further transistor 27 is provided between terminals *a* and *b*, and has its base coupled via a resistor $R_5$ to a manual set enable line (control terminal *d*).

For purposes of simplification, the overall circuit of FIGURE 2 may hereinafter be designated by a block type logic symbol, A, shown to the right of the FIGURE 2 circuit and having the various terminals *a* through *d* inclusive represented thereon. The operation of the FIGURE 2 circuit will become readily apparent upon consideration of the circuit of FIGURE 4. However, before analyzing the operation of the FIGURES 2 and 4 circuits, reference is made to the block schematic of FIGURE 3, which illustrates the advantages to be derived from use of the circuit.

As has previously been mentioned, in large data processing systems, the number of control (set and indicated) leads can be very numerous. If there is only one group of manual sets and indicators, i.e., only one console, for a plurality of processors, the number of control leads can be considerably reduced by utilizing a switching or enabling system to select which processor is "on line." This selection can be accomplished either at the indicator (or console) end of the system, or at the flip flop (processor) end of the system. The arrangement of FIGURE 1 effects a reduction in the number of control leads required by combining the manual set and indicate leads into a single control lead. By employing the arrangement of FIGURE 2 for control purposes, the number of leads normally required for complete control of a multiprocessor system can be even further reduced. By way of example, let us assume that the complete data processing system comprises five central processors $CP_1$ through $CP_5$ inclusive (see FIGURE 3), but that control console space is available for only one processor, i.e., only the single control console CC can be utilized. If each processor has a total of 500 control leads, the enable system should be capable of handling five groups of 500 leads each, i.e., should be adapted to control 2,500 leads. To enable all of these control leads at the console would be a very complex task. However, by enabling each of the 2,500 control leads at its respective processor, the enabling problem is considerably simplified and the number of control leads extending between the several processors and the common control console can be reduced to ⅕ of the number which would otherwise be required.

This enabling at the central processors can be effected by busing together various portions of the central processors $CP_1$ through $CP_5$. More particularly, let us assume that, in the system shown in FIGURE 3, each of the five central processors has five interface registers which could be designated OTR, ADR, AR, AX, and MR; and let us further assume that each of these registers has fifteen bits numbered from 0 to 14. The bits of the OTR register, for example, can then be designated $OTR^0$ through $OTR^{14}$ inclusive, where $OTR^0$ is the zero bit of register OTR; and similar designations could be used for the other registers. Each corresponding ordered bit of each corresponding register in the several data processors $CP_1$ through $CP_5$ may be bused together at the processors themselves; e.g., the zero bits of all five OTR registers would be bused together, the one bits of all OTR registers would be bused together, etc., the zero bits of all ADR registers would be bused together, etc. The various resulting bit buses, interconnecting the several corresponding register orders, may thereafter be coupled to the control console CC; and such a coupling arrangement to the console would involve considerably fewer leads than would otherwise be necessary if each bit of every register in a multi-processor system was coupled to the console by its own individual control lead.

Figure 3:
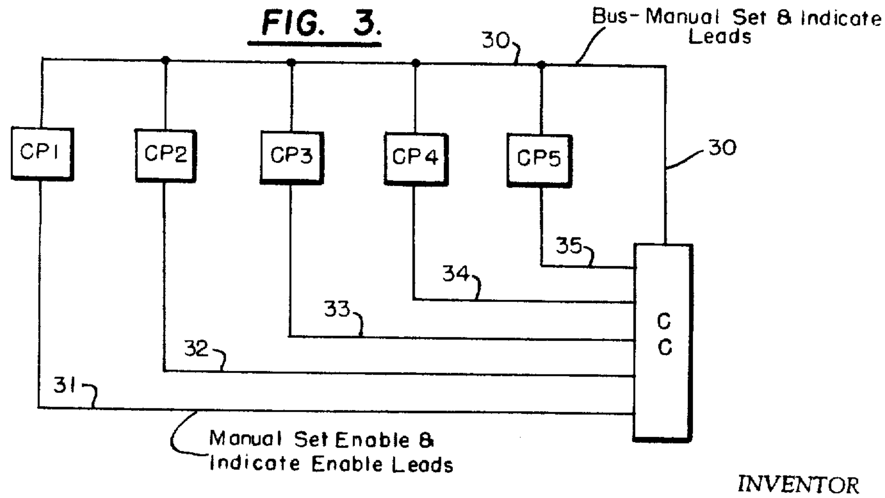
FIGURE 3 is a block diagram of a multiprocessor system associated with a single control console, and interconnected to one another in accordance with the present invention.

In the arrangement of FIGURE 3, the several bit buses, and their interconnection to the control console, are designated as a bus 30 which comprises a plurality of leads arranged in the manner described. Since each lead in bus 30 is, in accordance with the described arrangement, coupled to a plurality of like order register stages, however, auxiliary control means should be provided to determine which one of the several register stages is to be operated or monitored by a signal appearing on the bit bus interconnecting said several register stages. Accordingly, the system of FIGURE 3 includes, in addition to bit buses 30, a plurality of control cables 31 through 35 inclusive which extend from the control console to the several central processors $CP_1$–$CP_5$ respectively. Each of said cables 31–35 comprises two control leads adapted to be controlled at console CC, i.e., each cable includes a manual set enable lead and an indicate enable lead. By operating a particular one only of said cables at any particular time, a particular one only of the processors $CP_1$–$CP_5$ will be placed "on line" for setting and monitoring purposes.

Figure 4:
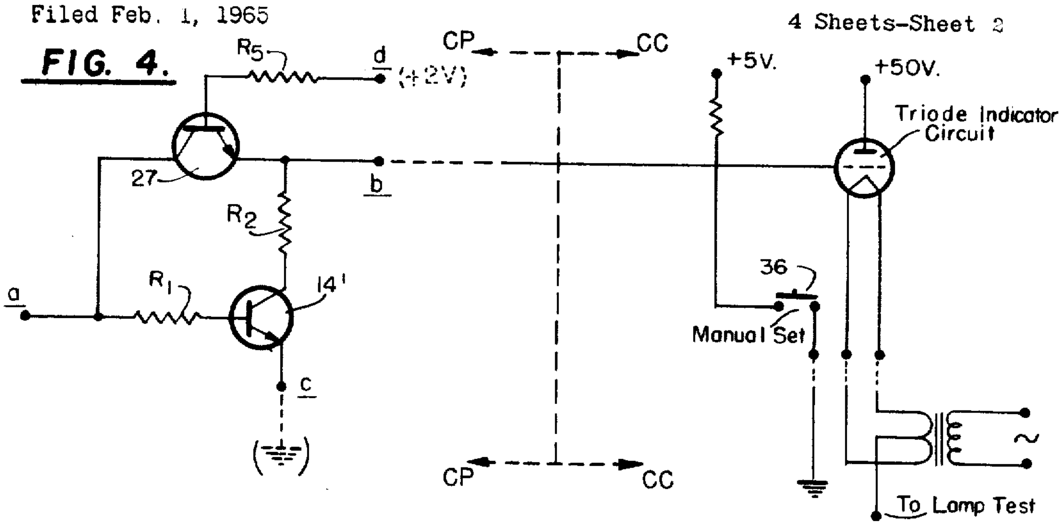
FIGURE 4 is a schematic diagram similar to that of FIGURE 1 showing the utilization of the circuit of FIGURE 2 in a system of the type illustrated in FIGURE 3.
Figure 5:
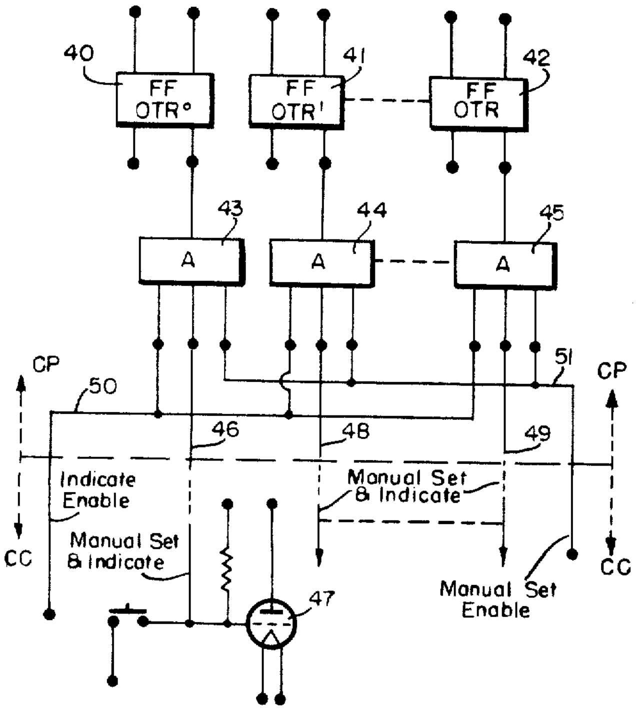
FIGURE 5 is a schematic diagram illustrating an enable system such as may be employed to effect single console control of plural bistable or register stages in a given processor.
Figure 6:
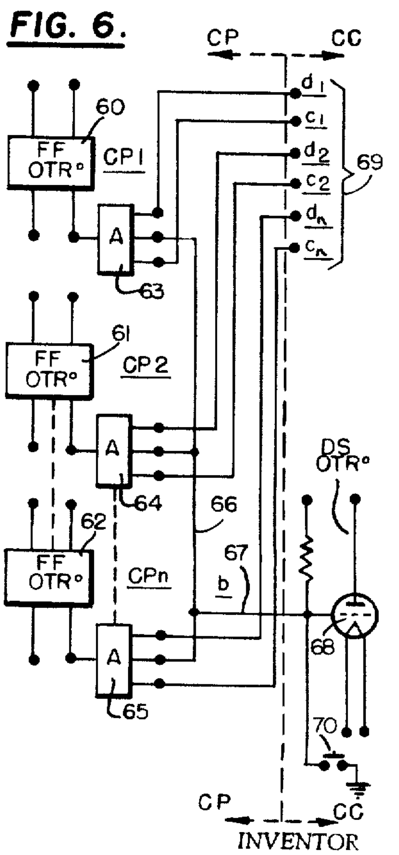
FIGURE 6 is a schematic diagram illustrating an enable system wherein a given control console may supervise circuits in a plurality of different remotely located data processors.
Figure 7:
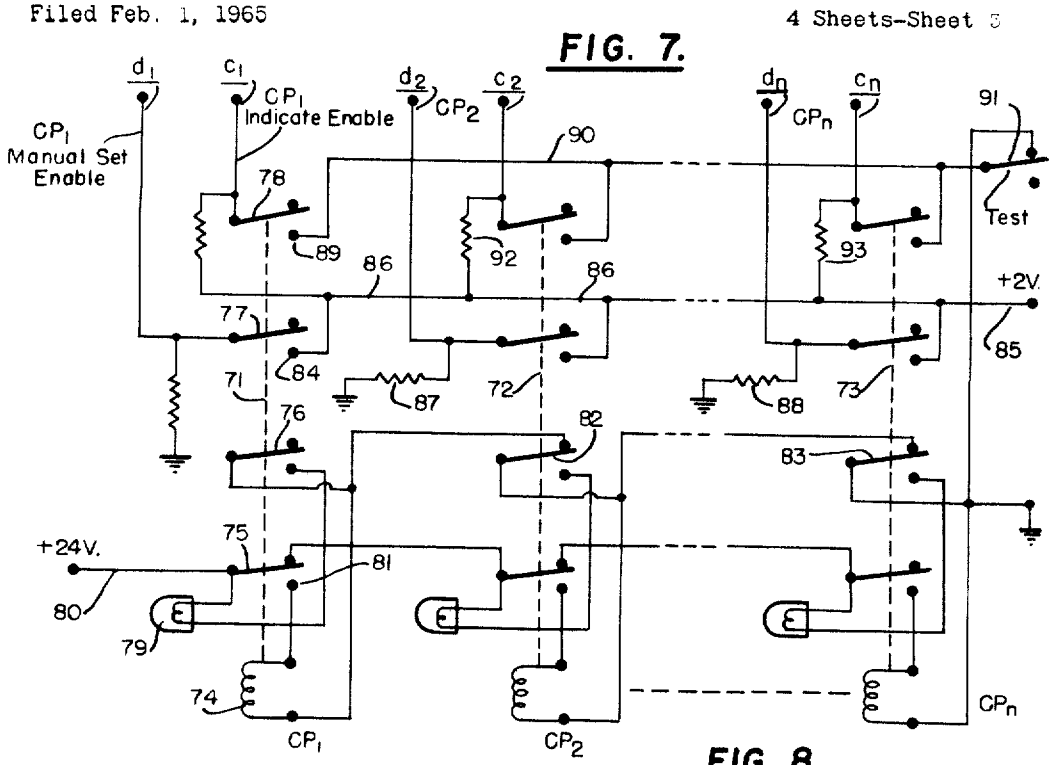
FIGURE 7 is a schematic diagram of a control arrangement such as may be employed, for example, in conjunction with the arrangement of FIGURE 6 to effect processor selection in a multiprocessor system.

A small portion of the overall arrangement thus described in reference to FIGURE 3 is depicted in the schematic of FIGURE 4, and various other aspects of the overall system are shown in FIGURES 5, 6, and 7, each of which figures is concerned with a multiprocessor arrangement under the control of a single console. The basic circuit of the indicator and enable system for any given processor is shown in FIGURES 4 and 5. In this portion of the arrangement, it is contemplated (for example, see FIGURE 5), that all of the manual set enable leads (terminal *d* of FIGURES 2 and 4) of the given main processor are connected together; and similarly, all of the indicate enable leads (terminal *c* of FIGURES 2 and 4) for said given processor would also be connected together.

A typical one of the central processor registers OTR, as depicted in FIGURE 5, may comprise a plurality of flip flops 40, 41 . . . 42 corresponding to the several bits of each OTR register. Similar flip flop arrangements would, of course, be present for each of the other registers in the same central processor, as well as for the other registers in the other central processors. The individual set terminals of the flip flops 40, 41, 42 are coupled, at the processor, to driver isolation circuits 43, 44, 45, etc., each of which may take the form described in reference to FIGURE 2. The common manual set and indicate lead of each control circuit is coupled to an individual triode indicator circuit at the console. For example, the control line 46 of circuit 43 is coupled to console located triode indicator circuit 47 which corresponds in structure and operation to the triode indicator circuit DS already described in reference to FIGURE 1. Similarly, the control line 48 of circuit 44 is coupled to another indicator circuit at the console; and the control line 49 of circuit 45 is coupled to still another console indicator, etc.

The several indicate enable lines of the control circuits 43, 44, 45, etc., are bused together and connected to a common indicate enable line 50 adapted to be controlled at the console; and similarly, the several manual set enable lines of the control circuits 43, 44, 45, etc., are bused together and connected to a common manual set enable line 51 also adapted to be controlled at the console. The resulting two lines 50 and 51, for any given processor, would accordingly constitute one of the cables shown in FIGURES 3, e.g., cable 31. For each processor, therefore, there is one manual set and indicate lead for each bit, plus two enable leads. The enable leads are, of course, as long as the indicate and manual set leads, and are controlled by processor selector switches located at the console.

The operation of a single one of the control circuits shown in FIGURE 5, e.g., control circuit 43, will now be described by reference to FIGURE 4, which depicts the circuit interconnecting the manual set and indicate lead between an individual bit of a register in a central processor and the corresponding triode indicator at the control console. Thus, referring to FIGURE 4, the driver isolation circuit comprises transistors 14' and 27. Transistor 27 may be enabled by placing the base of said transistor 27 at a +2.0 volt potential, and transistor 14' may be enabled by placing the emitter leg of said transistor 14' at ground potential. Because the emitter leg of transistor 27 is at a potential equal to or greater than +2.0 volts, transistor 27 is normally biased off. If, however, the manual set switch 36 is momentarily depressed (and regardless of the existing condition of the indicator, the driver or the associated flip flop) the emitter leg of transistor 27 drops to ground potential, putting transistor 27 into conduction and forcing a binary "1" at terminal *a* and in the flip flop connected thereto (not shown in FIGURE 4). With a "1" now at terminal *a*, and the switch 36 again opened, transistor 27 will cut off thereby allowing terminal *b* to approach the supply voltage coupled to the grid of the triode indicator, putting the triode indicator into conduction. The resulting display of the triode indicator signifies a "1" at the flip flop connected to terminal *a*. The circuit can, by applying a +2 volt potential at the emitter of transistor 14', force the triode indicator into a test mode. This can be accomplished regardless of the condition of the driving circuits, and without disturbing the existing state of the flip flop. To permit simultaneous testing of all the indicators of a processor, the emitter legs of all the transistors 14' can be tied together.

In the multiprocessor configuration thus far described in reference to FIGURES 3, 4, and 5, complete control can be effected at the console with only one-fifth of the total possible control leads which would otherwise be necessary. The enable circuits, however, must be contained within each processor to effect this reduction in leads; and this is effected in the manner described previously, i.e., by tying together all of the indicate enable and all of the manual set enable leads of a single processor as is illustrated at 50 and 51 of FIGURE 5, and as is designated at 31 in FIGURE 3.

In a multiprocessor operation, by duplicating these pairs of enable control lines in the manner designated at 32–35 of FIGURE 3, the operator at the console may select just which of the processors $CP_1$–$CP_5$ (of FIGURE 3) he wishes to place "on line." This particular consideration is better shown in FIGURE 6 wherein selected bits of corresponding registers in a plurality of central processors are depicted. More particularly, in the multiprocessor system each register of the central processor $CP_1$ is arranged in the manner already described in reference to FIGURE 5; and this has been depicted symbolically in FIGURE 6 by the single flip flop 60 corresponding to one bit of a single typical register in central processor $CP_1$. By the same token, the other central processors will contain corresponding registers; and this has been depicted by the typical flip flop 61 for the central processor $CP_2$, and by the typical flip flop 62 for the central processor $CP_n$. Each of the registers is associated with driver isolation circuits of the types already described; and this is represented in FIGURE 6 by the control circuit 63 for processor $CP_1$, by the control circuit 64 for processor $CP_2$, and by the control circuit 65 for processor $CP_n$. The several flip flops 60, 61, and 62 are thus typically representative of the zero bits in the OTR registers of the several processors $CP_1$, $CP_2$ . . . $CP_n$; and these corresponding bits are bused together by a bus 66 located at and extending between the data processors, and interconnecting the various manual set and indicate terminals *b* of the several control circuits 63, 64, 65.

Bit bus 66 is coupled via a common control line 67 to a console located triode indicator circuit 68, in this case the indicator for the bused $OTR^0$ bits of the several processors $CP_1$, $CP_2$, etc. A plurality of pairs of enable lines designated 69 are also located at the console whereby, by appropriate operation of these enable lines, the indicator 68 may view the zero bit condition in the OTR register of any selected data processor, or alternatively, by depression of the switch 70, a signal may be transferred to set the $OTR^0$ bit position in any selected register. If the enable line $d_1$ is, for example, operated, depression of switch 70 will set flip flop 60 only. Depression of the same switch 70 may similarly be caused to set flip flop 61 by operation of enable line $d_2$; the same switch 70 may be utilized to set flip flop 62 by operating line $d_n$, etc. By the same token, the single indicator 68 may be caused to observe the operating state of any of the several flip flops by appropriate control of the indicate enable lines $c_1$, $c_2$ . . . $c_n$. It will be appreciated, of course, that in practice, the system partially illustrated in FIGURE 6 would be suitably expanded to permit control of all of the flip flop register stages in all of the several data processors.

The arrangement of FIGURE 6 is preferably associated with a control circuit of the type shown in FIGURE 7 to permit appropriate operation of the several enable lines and to provide appropriate visual indications of the selected processor, while assuring that only one processor is "on line" at any given time. The various enable lines $d_1$, $d_2$, $c_1$, $c_2$, etc., associated with the several central processors $CP_1$, $CP_2$, etc., previously identified in reference to FIGURE 6, are shown at the upper portion of FIGURE 7. These enable lines are in turn connected to a plurality of magnetic latch gang switches 71, 72, 73, etc., located at the control console and individually adapted, upon depression, to select and place "on line" a particular one only of the several central processors. The various switches 71, 72, and 73 are provided respectively to select associated processors $CP_1$, $CP_2$, and $CP_n$; and as will be appreciated from an examination of the circuit shown in FIGURE 7, the mechanical and electrical arrangement for each of said switches is essentially the same. Accordingly, for purposes of simplicity, the arrangement and operation of only one switch will be described, since the description applies equally as well to the other switches.

Considering typical switch 71, it will be seen that this switch comprises a latching coil 74 associated with a ganged plurality of manually actuable switch blades 75, 76, 77, and 78. Switch blade 78 is used to control the indicate enable line $c_1$ for the processor $CP_1$. Switch blade 77 is used to control the manual set enable line $d_1$ for the same processor $CP_1$. Switch blades 75 and 76 control the energization of latching coil 74 and indicator lamp 79, and also operate, as will become apparent, to assure that once switch 71 is operated, central processor $CP_1$ alone will be "on line."

When the several switch blades 75 through 78 are in the position illustrated in FIGURE 7, the energization circuit for latching coil 74 and for indicator lamp 79 is open. If the switch 71 should now be depressed, a circuit is completed from a +24 volt source 80 through contact 81 to one side of coil 74 and thence via coil 74, blade 82 of switch 72, and blade 83 of switch 73, to ground. The resulting energization of coil 74 holds the several switch blades 75 through 78 in a latched condition until the switch 71 is returned to its original position, or until one of the other switches 72 or 73 is operated. If this latter operation should occur, i.e., if either switch 72 or 73 is operated, it will be seen that the holding circuit for coil 74 through switch blades 82 and 83 will be broken, thereby taking processor $CP_1$ "off line" at the same time that one of the other processors is placed "on line."

Considering further the operation of switch 71, it will be seen that depression of switch 71, in additional to energizing latching coil 74 via blade 75, also completes a circuit from source 80 through lamp 79 and thence via switch blades 76, 82, and 83 to ground. Indicator lamp 79 will accordingly indicate the particular processor which has been placed "on line." Again, if one of the other switches 72 or 73 should be depressed, the energization circuit for lamp 79 will be broken, and a new energization circuit made for the indicator lamp associated with the switch 72 or 73 which has been depressed.

The movement of switch blade 77 into contact with terminal 84 places a +2 volt potential, from source 85 via line 86, on the manual set enable terminal $d_1$, thereby operating line $d_1$ and its associated transistor into an enabled state. The other manual set enable lines $d_2$ and $d_n$ are however still coupled to ground, e.g., via resistors 87 and 88 respectively, whereby they are not enabled. Similarly, movement of switch blade 78 into engagement with terminal 89 completes a circuit from indicate enable line $c_1$ through blade 78, contact 89, line 90, and test switch 91 to ground, thereby operating the indicate enable line $c_1$ and its associated transistor to an enabled condition. The other indicate enable lines $c_2$ and $c_n$ are, however, still coupled to the aforementioned +2 volt source 85 via resistors 92 and 93 respectively, whereby said lines $c_2$ . . . $c_n$ remain in a disabled condition.

Thus, the depression of switch 71 operates its various switch blades to present the proper enable potentials on the lines $d_1$ and $c_1$, establishes a holding circuit for the overall switch, and operates an indicator lamp showing the particular processor which has been selected and placed "on line." So long as switches 72 and 73 are not operated, their associated enable lines will be maintained in a disabled condition. Transfer of control from one central processor to another may be accomplished by the simple expedient of depressing the appropriate one of switches 71, 72 . . . 73; and this will automatically place a corresponding processor "on line," while simultaneously and automatically removing any other processor which may then by "on line."

It should further be noted that when no processors have been selected, all of the indicate enable leads are at a +2.0 volt potential, and this in turn forced terminal *b* (see FIGURE 6) to a "zero" state, allowing all of the indicators to emit light. This is also the case just after "power up" of the processors. As soon as a particular processor has been selected, however, the enable circuits in that processor are activated in the manner described, i.e., by applying a +2.0 volts to the selected manual set enable lines and by grounding the selected indicate enable lines; and all of the set indicate and enable circuits of the other processors remain inactive.

Figures 8, 9:
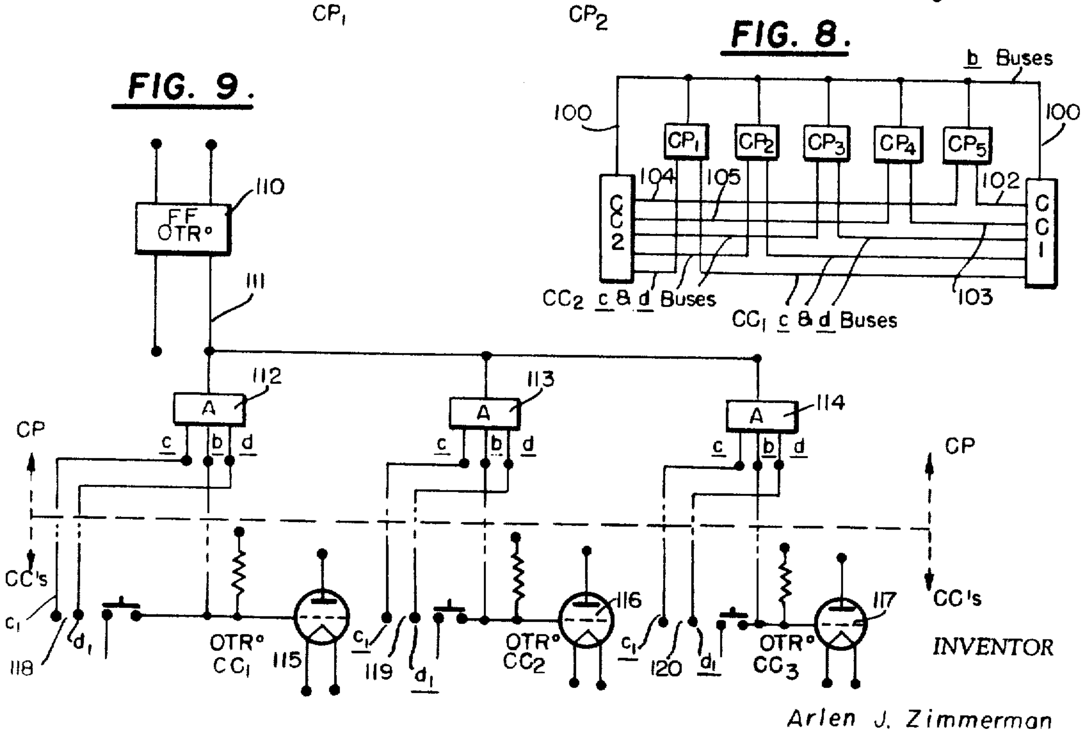
FIGURE 8 is a block diagram of a system constructed in accordance with the present invention arranged to effect multiprocessor control by means of a plurality of control consoles.
FIGURE 9 is a schematic diagram of a control system such as may be employed in the arrangement of FIGURE 8, and illustrates an enable circuit arrangement for a plurality of consoles; nad

The system thus far described readily lends itself to the addition of further control consoles, whereby any one of a plurality of control consoles may be utilized to control any one of a plurality of data processors. This possible arrangement is illustrated symbolically in FIGURE 8, wherein the several processors $CP_1$ through $CP_5$ inclusive are interconnected in a manner generally similar to that described previously in reference to FIGURE 3, but are further associated with a plurality of control consoles, typically designated in FIGURE 8 as $CC_1$ and $CC_2$. Each of the control consoles is coupled to the several central processors in a manner generally similar to that already described in reference to FIGURE 3. Thus, the bit buses are interconnected at the various $b$ terminals of the several driver isolation circuits, and are then in turn coupled to control console $CC_1$ and to control console $CC_2$ via bus 100. Control console $CC_1$ further includes a plurality of enable leads designated as cables 102, 103, etc., coupled respectively to central processors $CP_5$, $CP_4$, etc.; whereas control console $CC_2$ includes a further plurality of enable leads designated as cables 104, 105, etc., coupled to central processors $CP_5$, $CP_4$, etc. By this arrangement, and by using control circuits generally similar to those of FIGURE 7 in association with other control circuits to be described hereinafter, any one of the several control consoles may be selected to control the operation of any one of the several central processors.

When a plurality of consoles is provided, individual enable circuits should be provided for control at each console to assure that a particular processor is under the control of a preselected one of the several consoles. This consideration is shown in part in the schematic of FIGURE 9. The typical flip-flop 110 is intended to illustrate a particular bit in a selected one of plural central data processors. The set line 111 of said flip flop 110 may be coupled to a plurality of driver isolation circuits 112, 113, 114, etc., the $b$ lines of which are in turn individual coupled to corresponding bit triode indicator circuits 115, 116, and 117 located respectively in the different consoles $CC_1$, $CC_2$, $CC_3$, etc. Each of the driver isolation or control circuits 112, 113, and 114 includes enuable lines 118, 119, 120, etc., also coupled to the several different consoles. Thus, the enabling of lines 118, for example, permits console $CC_1$ to control operation of $OTR^0$ flip flop 110, whereas the enabling of lines 119 permits console $CC_2$ to assume control of the same flip flop 110, etc. The arrangement is also preferably such that the console which first selects a particular processor will have complete control of at least the manual set enable circuits for all processors. The other consoles can, however, be so arranged as to permit their viewing of processor operations, even though their manual set enable circuits are maintained in a disabled condition due to prior selection of a different console.

Figure 10:
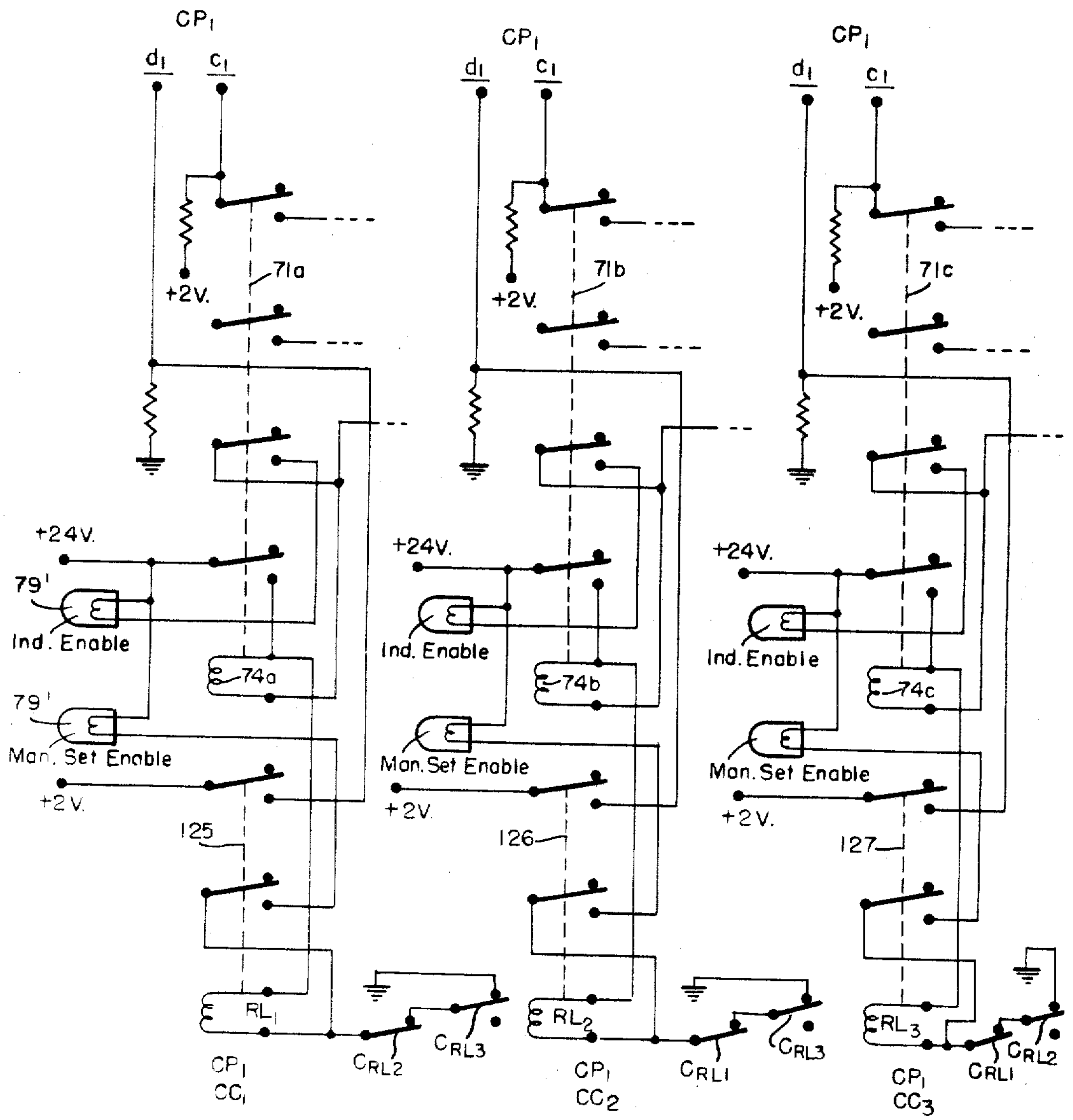
FIGURE 10 is a schematic diagram illustrating a processor selection arrangement for different consoles.

A control arrangement operating in the manner described is shown in FIGURE 10. The upper portion of this figure is depicted only symbolically, and corresponds in arrangement and operation to the control circuit already described in reference to FIGURE 7. Each control channel of the FIGURE 7 arrangement is duplicated a number of times corresponding to the number of control consoles to be employed; and the arrangement of FIGURE 10 accordingly depicts a system for providing control for one processor only, i.e., $CP_1$, from any one of a plurality of consoles $CC_1$, $CC_2$, and $CC_3$ (see the bottom of FIGURE 10). The circuits for each manually actuable switch 71*a*, 71*b*, and 71*c* corresponds to the circuit for switch 71 of FIGURE 7, previously described; and the appropriate one of said switches 71*a*, 71*b*, 71*c*, etc., is actuated at the several consoles depending upon which of the several control processors is to be placed on line. Analogous arrangements would, of course, be provided for control of processors $CP_2$ . . . $CP_n$. The individual switches 71*a*, 71*b*, and 71*c*, etc., of FIGURE 10 are intended to cooperate with latching coils such as 74*a*, 74*b*, 74*c*, etc., and with indicators such as 79' once a selected one of the magnetic latch switches is depressed. The upper portions of FIGURE 10 may thus be treated as a plurality of switches operating to select a particular processor which is placed "on line"; and once such a processor has been selected, that processor alone is subject to console control, with the other processors being taken "off line" in the manner described in reference to FIGURE 7.

The lower portion of FIGURE 10 depicts a plurality of additional switches 125, 126, 127, etc., which are utilized to select a particular one of the several control consoles $CC_1$, $CC_2$, $CC_3$, etc., for use in controlling the operation of the selected data processor. These switches 125, 126, 127, etc., may comprise relays designated respectively $RL_1$, $RL_2$, $RL_3$, etc.; and the energization circuit for each relay coil is completed in part through switch blades associated with the other relays in the overall arrangement. Thus, it will be seen that relay $RL_1$ (energized when processor $CP_1$ is to be controlled from console $CC_1$) has one side of its coil connected to ground through relay blade $C_{RL_2}$ associated with relay $RL_2$, and also through relay blade $C_{RL_3}$ associated with relay $RL_3$. As a result, relay $RL_1$ may have its coil energized only so long as relays $RL_2$ and $RL_3$ are not energized. The selection of any one of the several relays $RL_1$, $RL_2$, $RL_3$ thus not only completes a circuit for its particular coil, but also opens the possible energization circuits for the other relay coils, assuring that only one console may be placed on line at any given time.

While I have thus described preferred embodiments of my invention, many variations will be suggested to those skilled in the art, and it must therefore be understood that the foregoing description is meant to be illustrative only and not limitative of my invention. Certain variations will be immediately apparent. For example, the arrangement of FIGURE 9 may be considered to illustrate the possibility of a "fan out" in that a number of circuits can be coupled to the same terminal of any given flip flop if that flip flop has the capacity to drive a plurality of such circuits. In addition, it will be appreciated that the various circuits described can be employed to drive power amplifiers instead of the particular triode indicator circuits illustrated; and these power amplifiers may in turn be employed to drive incandescent indicators, other forms of monitoring devices, or relays required for other control console operations. All such arrangements, and others which will be apparent to those skilled in the art, are accordingly meant to fall within the scope of the appended claims.

Having thus described my invention, I claim:

1. In combination, a data processor having a plurality of registers each of which is adapted to store information at a plurality of different order bit positions, a control console located at a position remote from said data processor, said control console including a plurality of monitors associated respectively with the different order bit positions of said data processor registers, said control console also including a plurality of signal setting means associated respectively with the different order bit positions of said data processor registers, a plurality of control circuits coupled respectively to the different order bit positions of all said registers, said control circuits each including first and second enable means individually operable to vary the signal transfer state of its associated control circuit, a plurality of signal transfer lines respectively coupling each of said control circuits to a selected one of said monitors and to a selected one of said signal setting means in said console whereby a given one of said signal transfer lines may be employed selectively to transfer a setting signal to a given order bit position in a selected one of said registers and may also be employed selectively to transfer a signal from a given order bit position in a selected one of said registers to one of said monitors in dependence respectively upon the signal transfer states of said control circuits, a plurality of first bus means respectively interconnecting the first enable means of the control circuits associated with each given one of said registers, a plurality of second bus means respectively connecting the second enable means of the control circuits associated with each given one of said registers, whereby all the order bit positions of a given selected one of said registers are enabled to be set under the control of a single one of said first bus means and all the order bit positions of a given selected one of said registers are enabled to be monitored under the control of a single one of said second bus means, and means at said console for selectively operating different selected ones of said first and second bus means.

2. The combination of claim 1 wherein each of said control means comprises first and second transistors, means coupling the collector of said first transistor to the base of said second transistor and to a given order bit position of one of said registers, means coupling the emitter of said first transistor to the collector of said second transistor and to one of said signal transfer lines, said first bus means being coupled to the base of said first transistor, and said second bus means being coupled to the emitter of said second transistor.

3. The combination of claim 1 wherein each of said monitors comprises a triode indicator circuit having one of said signal transfer lines coupled to the grid thereof, each of said signal setting means comprising manually actuable switch means for selectively altering the potential of the grid of said triode indicator circuit.

4. In combination, a data processor having a plurality of registers, a plurality of control consoles located at a position remote from said data processor, said control consoles each including a plurality of monitors associated respectively with said data processor registers, said control consoles also each including a plurailty of signal setting means associated respectively with said data processor registers, a plurality of control circuits coupled respectively to said registers, each of said control circuits including means normally operative to inhibit transfer of signals therethrough and further including first and second enable means individually operable to effect first and second different signal transfer states respectively through said control circuit, a plurality of signal transfer lines coupling said control circuits to said monitors in all said consoles and to said signal setting means in all said consoles whereby a given one of said signal transfer lines may be employed to transfer a setting signal to a selected one of said registers when its associated control circuit is in its first transfer state, and may also be employed to transfer a signal from a selected one of said registers to said monitors when its associated control circuit is in its second transfer state, and means for coupling the first and second enable means of all said control circuit to all of said consoles whereby selected ones of said first and second enable means may be operated from any one of said consoles, said coupling means including switch means responsive to the connection of said first enable means to a particular one of said consoles for disconnecting said first enable means from the others of said plurality of consoles whereby a selected one only of said consoles may control the transfer of setting signals to said registers at any given time.

5. The combination of claim 4 wherein said means coupling said second enable means to all of said consoles is independent of said switch means whereby all of said consoles may monitor the signal states of said registers simultaneously.

6. The combination of claim 4 wherein each of said registers includes a plurality of information storage elements for storing different items of information respectively, there being one of said control circuits coupled to each of said information storage elements.

7. In combination, a plurality of data processors each of which has a plurality of registers adapted to store information at a plurality of different order bit positions, the registers in each of said data processors having corresponding registers in each of the other data processors, a plurality of bus means connecting the order bit positions of each register in each of said processors to the corresponding order bit position of the corresponding registers in the others of said processors, a plurality of control consoles located at positions remote from said data processors, said control consoles each including a plurality of monitors associated respectively with the interconnected different order bit positions of said data processor registers, said control consoles also each including a plurality of signal setting means associated respectively with the interconnected different order bit positions of said data processor registers, a plurality of conditionally operable control circuits coupled respectively to said plurality of bus means, each of said control circuits including first and second enable means individually operable to vary the signal transfer state of its associated control circuit, operator means in each of said consoles for selectively operating all of said first and second enable means, a plurality of signal transfer lines respectively coupling said control circuits to said monitors in all said consoles and to said signal setting means in all said consoles whereby a given one of said signal transfer lines may be employed, in response to operation of said first enable means, to transfer a setting signal to a given order bit position in selected ones of said interconnected registers and may also be employed, in response to operation of said second enable means, to transfer a signal from a given order bit position in selected ones of said interconnected registers to said monitors, first switch means for coupling a selected one of said data processors to said plurality of consoles thereby to select a particular one of said data processors for control by said consoles, and second switch means for rendering the operator means in a selected one of said consoles operative to control said particular data processor and including means disabling operation of at least said first enable means in the non-selected ones of said consoles.

8. In combination, a data processor having register means adapted to store information at a plurality of different order bit positions, a control console located at a position remote from said data processor, said control console including a plurality of indicators associated respectively with the different order bit positions of said data processor register means, said control console also including a plurality of manually settable means associated respectively with the different order bit positions of said data processor register means, a plurality of control circuits each of which includes a pair of interconnected selectively conductive elements coupled via a first line to a preselected order bit position of said register means, said control circuits also each including an indicate-enable line and a manual-set enable line for controlling the states of conductivity of said selectively conductive elements respectively, each of said control circuits further including a signal transfer line coupling said interconnected elements to a selected one of said indicator means and to a selected one of said manually settable means in said console whereby a given one of said signal transfer lines may be employed selectively to transfer a signal via its associated control circuit upon actuation of said one of said manually settable means operative to set a given order bit position in said register means to a desired signal state, and may also be employed selectively to transfer a signal via its associated control circuit from said register means to said one of said indicator means indicative of the signal state in said given order bit position of said register means, in dependence respectively upon the states of conductivity of said elements, first bus means interconnecting the indicat-enable lines of said plurality of control circuits, second bus means interconnecting the manual-set enable lines of said plurality of control circuits, means coupling said first and second bus means to said console, and means at said console for selectively varying the potentials on said first and second bus means to control the states of conductivity of said elements thereby to control the signal transfer operations of said signal transfer lines.

9. In combination, a plurality of data processors each of which has register means adapted to store information at a plurality of different order bit positions, a control console common to said plurality of data processors and located at a position remote from said data processors, said control console including a plurality of indicators associated respectively with the different order bit positions of all said register means, said control console also including a plurality of manually settable means associated respectively with the different order bit positions of all said register means, a plurality of control circuits coupled respectively to the different order bit positions of said register means, each of said control circuits including first and second enable means individually operable to vary the signal transfer state of said control circuit, plural bus means respectively interconnecting the control circuits associated with corresponding order bit positions in the register means of said plurality of data processors, each of said bus means being coupled to a selected one of said indicator means and to a selected one of said manually settable means in said console whereby a given one of said bus means may be employed selectively to transfer a setting signal to a given order bit position in at least one of said register means and may also be employed selectively to transfer a signal from one of said register means to said one of said indicator means in dependence respectively upon the signal transfer states of said control circuits, and means at said console for selectively varying the potentials on different selected ones of said first and second enable means to individually control the signal transfer states of said interconnected control circuits.

10. In combination, a plurality of data processors each of which has register means adapted to store information at a plurality of different order bit positions, a plurality of control consoles common to each of said plurality of data processors and located at positions remote from said data processors, each of said control consoles including a plurality of indicators associated respectively with the different order bit positions of all said register means, each of said control consoles also including a plurality of manually settable means associated respectively with the different order bit positions of all said register means, a plurality of control circuits coupled respectively to the different order bit positions of said register means, each of said control circuits including enable means individually operable to vary the signal transfer state of each said control circuit, plural bus means respectively interconnecting the control circuits associated with corresponding order bit positions in the register means of said plurality of data processors, each of said bus means being coupled to a selected one of said indicator means and to a selected one of said manually settable means in each of said consoles whereby a given one of said bus means may be employed selectively to transfer a setting signal to a given order bit position in at least one of said register means and may also be employed selectively to transfer a signal from one of said register means to said one of said indicator means in dependence respectively upon the signal transfer states of said control circuits, operator means at each of said consoles for selectively controlling different selected ones of said enable means thereby to individually control the signal transfer states of said interconnected control circuits, and switch means interconnecting said plurality of consoles to one another and to said plurality of data processors and operative to select a particular one of said consoles for control of said enable means.

11. In combination, data processor means having a plurality of registers each of which is adapted to store information at a plurality of different order bit positions, a plurality of bus means respectively interconnecting the corresponding ordered bit positions of said plurality of registers, control console means having a plurality of signal monitors associated respectively with the different interconnected order bit positions of said registers, said control console means also including a plurality of signal setting means connected respectively to said plurality of signal monitors, a plurality of conditionally operable signal transfer circuits coupled respectively between said plurality of bus means and said plurality of interconnected signal monitor and signal setting means, and enable means coupled to said conditionally operable signal transfer circuits and operable from said console means for selectively conditioning a selected one of said signal transfer circuits to a first state thereby to set a given order bit position in a selected one of said registers to a desired signal state upon operation of one of said signal setting means, and operable for selectively conditioning the same one of said signal transfer circuits to a second state different from said first state for transferring a signal to one of said signal monitors indicative of the signal state in said given order bit position of said selected one of said registers.

12. The combination of claim 11 wherein said data processor means comprises a plurality of data processors, said plurality of registers being located in different ones of said data processors respectively.

13. The combination of claim 11 wherein each of said conditionally operable signal transfer circuits includes a pair of transistors each of which has two electrodes thereof connected to two electrodes of the other of said transistors, said enable means comprising a pair of control lines coupled respectively to the third electrodes of said pair of transistors, and means for individually controlling the potential level of said pair of control lines thereby to control the potential levels at said electrode interconnections.

14. The combination of claim 11 wherein said control console means comprises a plurality of control consoles, and switch means for connecting a selected one of said control consoles to said data processor means.

15. In combination, a plurality of data processors having registers therein, a plurality of control consoles each of which includes signal monitoring means and signal setting means, a plurality of selectively operable signal transfer links interconnecting each of said plurality of consoles to registers in each of said plurality of data processors, each of said transfer links including a selectively enabled control circuit and an individual control line adapted to transfer a signal from at least one of said data processors to at least one of said console monitoring means and alternatively adapted to transfer, via said same control line, a register setting signal from one of said consoles to at least one register in at least one of said data processors in dependence respectively upon the enabled state of the control circuit coupled to said individual control line, first and second enable means at each of said consoles individually operable to place each of said control circuits into either of two different enabled states corresponding to said alternative signal transfer operations, and switch means interconnecting said consoles for selecting one of said consoles for operation, said switch means including means for operatively disabling at least the register setting enable means of the non-selected ones of said consoles.

16. In combination, a plurality of data processors having registers therein, a control console having a plurality of signal monitoring means and signal setting means therein, a plurality of selectively operable signal transfer links interconnecting the signal monitoring and signal setting means of said console to said registers in said plurality of data processors, said transfer links including a plurality of selectively enabled control circuits coupled to said registers respectively, bus means interconnecting said control circuits, an individual control line coupled to said bus means and adapted to transfer a signal from at least one of said data processor registers to one of said console monitoring means and alternatively adapted to transfer, via said same control line, a register setting signal from said console to at least one register in at least one of said data processors in dependence respectively upon the enabled states of the control circuits coupled via said bus means to said individual control line, and a plurality of first and second enable means at said console individually operable to place each of said control circuits into either of two different enabled states corresponding to said alternative signal transfer operations.

17. In combination, a data processor having a plurality of registers therein, a plurality of control consoles each of which includes signal monitoring means and signal setting means, a plurality of selectively operable signal transfer links interconnecting each of said plurality of consoles to each of said plurality of registers, each of said transfer links including a selectively enabled control circuit and an individual control line adapted to transfer a signal from one of said registers to one of said console monitoring means and alternatively adapted to transfer, via said same control line, a register setting signal from one of said consoles to one of said registers in dependence respectively upon the enabled state of the control circuit coupled to said individual control line, first and second enable means at each of said consoles individually operable to place selected ones of said control circuits into either of two different enabled states corresponding respectively to said alternative signal transfer operations, and control means for selecting any one of said consoles for signal transfer operations, said control means including means for operatively disabling at least the register setting enable means of the non-selected ones of said consoles.

References Cited

UNITED STATES PATENTS 3,300,764 1/1967 Doelz ------------ 340—172.5

ROBERT C. BAILEY, *Primary Examiner.*

R. ZACHE, *Assistant Examiner.*